US 11,211,049 B2

(12) United States Patent
Moore et al.

(10) Patent No.: US 11,211,049 B2
(45) Date of Patent: Dec. 28, 2021

(54) PROGRAM DIALOG BY EXAMPLE

(71) Applicant: International Business Machines Corporation, Armonk, NY (US)

(72) Inventors: Robert J. Moore, San Jose, CA (US); Pawan Chowdhary, San Jose, CA (US); Divyesh Jadav, San Jose, CA (US); Lei Huang, Mountain View, CA (US); Sunhwan Lee, San Mateo, CA (US); Eric Young Liu, Santa Clara, CA (US); Saurabh Mishra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/502,534

(22) Filed: Jul. 3, 2019

(65) Prior Publication Data

US 2021/0005178 A1 Jan. 7, 2021

(51) Int. Cl.
*G10L 15/06* (2013.01)
*G06N 20/00* (2019.01)
*G10L 15/30* (2013.01)
*G10L 15/22* (2006.01)
(Continued)

(52) U.S. Cl.
CPC .......... *G10L 15/063* (2013.01); *G06F 40/169* (2020.01); *G06N 20/00* (2019.01); *G10L 15/1815* (2013.01); *G10L 15/22* (2013.01); *G10L 15/30* (2013.01)

(58) Field of Classification Search
CPC ... G10L 15/063; G10L 15/1815; G10L 15/22; G10L 15/30; G06N 20/00; G06F 40/169
See application file for complete search history.

(56) References Cited

U.S. PATENT DOCUMENTS 7,305,345 B2  12/2007  Bares et al.
7,606,714 B2  10/2009  Williams et al.
10,628,133 B1 *  4/2020  Jiang .................. G10L 15/1822
(Continued)

FOREIGN PATENT DOCUMENTS

IN  201811034198 A  9/2018

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Michael Colucci
(74) *Attorney, Agent, or Firm* — Sherman IP LLP; Kenneth L. Sherman; Steven Laut

(57) ABSTRACT

One embodiment provides a method including receiving authoring conversational training data. A machine learning based conversational agent is trained with the conversational training data. The training includes: creating and storing example transcripts of user utterances, creating and storing example transcripts of agent utterances, sequencing utterance transcripts using the example transcripts of user utterances and the example transcripts of agent utterances, forming a corpus from the sequenced utterance transcripts, marking speech patterns that represent social actions from tagging the sequenced utterance transcripts, and forming a patterned corpus from the marked speech patterns.

20 Claims, 16 Drawing Sheets

(51) Int. Cl.
*G10L 15/18* (2013.01)
*G06F 40/169* (2020.01)

(56) References Cited

U.S. PATENT DOCUMENTS

| | | | |
|---|---|---|---|
| 11,017,778 B1* | 5/2021 | Thomson | G10L 15/22 |
| 2017/0300831 A1* | 10/2017 | Gelfenbeyn | G06F 16/3329 |
| 2017/0339274 A1* | 11/2017 | Odinak | H04M 3/5183 |
| 2018/0054523 A1* | 2/2018 | Zhang | G06N 5/04 |
| 2018/0367475 A1 | 12/2018 | Galley et al. | |
| 2019/0058793 A1* | 2/2019 | Konig | H04M 3/5183 |
| 2019/0156822 A1* | 5/2019 | Manuvinakurike | G10L 25/78 |

OTHER PUBLICATIONS

Vinyals, O. et al., "A Neural Conversational Model," Proceedings of the 31st International Conference on Machine Learning, 2015, pp. 1-8, JMLR: W&CP vol. 37, Lille, France.

Greene, T. et al., "Researchers paid people to talk to themselves so AI will sound less dumb," Sep. 9, 2018, pp. 1-6, The Next Web, downloaded: https://thenextweb.com/artificial-intelligence/2018/09/19/researchers-paid-people-to-talk-to-themselves-so-ai-will-sound-less-dumb/, Amsterdam.

\* cited by examiner

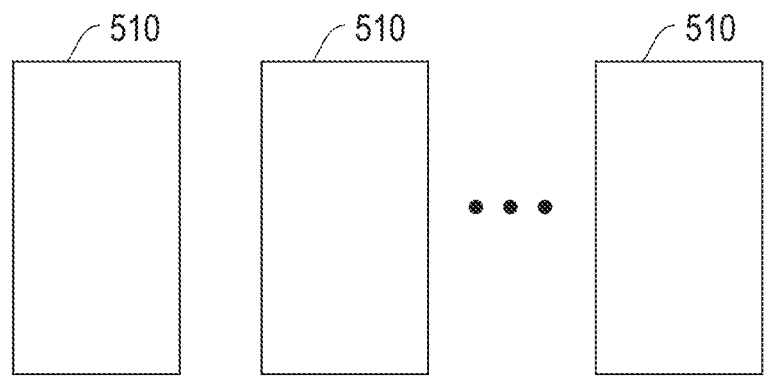
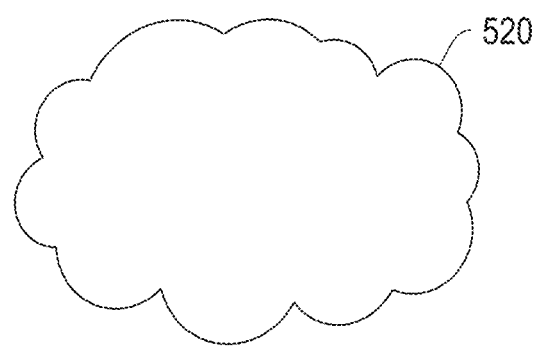
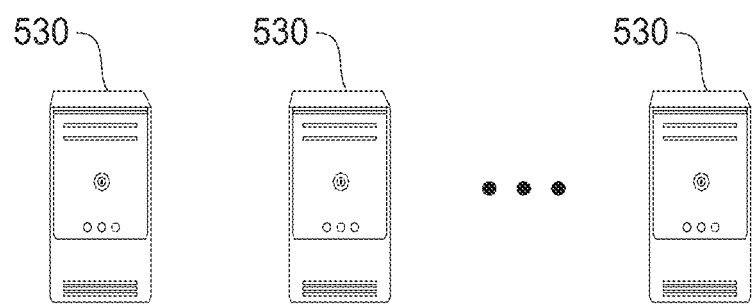
FIG. 5

1    ( (Describe your problem: browser keeps crashing) )
2 A: hi
3 U: hi
4 A: could you please let me know what is the operating system you are using ?
5 U: linux
6 A: ok this is the issue with the system performance, nasser, tools .
7 U: What is that ?
8 A: is it a windows machine ?
9 A: we have linux on your machine .
10 A: is it windows xp or windows 7 ?
11 U: i am using linux
12 A: let me take a remote of your machine and check if issue has been pushed properly .
13 U: ok

Step 1:
Design by Transcript

U: hi
A: Hi. How are you?
—
U: hey
A: Hey. How's it going?
—
U: hello
A: Hello. How are you?
U: can't complain
A: That's good.
U: hi
A: Hello.

U: hey there
A: Hey. How are you?
—
U: hello
A: Hello. How are you?
U: I'm terrible
A: I'm sorry to hear that. How can I help you?
U: hi
A: Hello.
...

U: hello
A: Hi there!
—
U: hello
A: Hello. How are you?
U: I'm great!
A: Great to hear! What can I do for you?
U: hello
A: Hello.
...

810 ⟵ (pointing to Step 1)

Resulting Agent Behavior

U: hi
A: Hi. How are you?
—
U: hey
A: Hey. How's it going?
—
U: hello
A: Hello. How are you?
U: can't complain
A: That's good.
U: hi
A: Hello.

U: hey there
A: Hey. How are you?
—
U: hello
A: Hello. How are you?
U: I'm terrible
A: I'm sorry to hear that. How can I help you?
U: hi
A: Hello.
⋮

U: hello
A: Hi there!
—
U: hello
A: Hello. How are you?
U: I'm great!
A: Great to hear! What can I do for you?
U: hello
A: Hello.
⋮

Step 2.5: Annotate Dynamic Entities — 1110

A: What's your name?
U: (Bob)@name
A: Hello, (Bob)@name! What can I do for you?

---

A: What is your name?
U: it's (Jill)@name!
A: Hi, (Jill)@name! What do you need?

---

A: Hello. What can I call you?
U: you can call me (Ray)@name
U: Hi, (Ray)@name. How can I help you?

⋮

A: What's your name?
U: call me (Peggy)@name
A: Hi, (Peggy)@name! How are you?

---

A: What is your name?
U: my name is (Don)@name
A: Hello, (Don)@name! How's it going?

⋮

Dynamic Entity is replaced with Context Variable — 1120

A: What can I call you?
U: Anne
A: Hi, ($name)! What do you need?

---

A: Hello. What can I call you?
U: call me Jim
U: Hi, ($name). How can I help you?

Add Example

Who starts: User | Agent

1230 — Recommended intents:

1210 — User: hey there #greeting        #greeting

1220 — Agent: Hey. #greeting How are you? #welfareCheck        #greeting  #welfareCheck User: Type utterance here

Done

1200

Transcript Editor

⚙ Filters
  User intents: #greeting
  Agent intents: #welfareCheck

Examples: 12 —1320

09/09/2018 @ 3:15 PM
U:  hey there #greeting
A:  Hey. #greeting How are you?
     #welfareCheck

↓

09/07/2018 @ 10:57 AM
U:  hi #greeting
A:  Hey. #greeting How are you?
     #welfareCheck 09/05/2018 @ 1:05 PM
U:  hello #greeting
A:  Hello. #greeting How are you?
     #welfareCheck
U:  I'm terrible #negAssessment

FIG. 13

PROGRAM DIALOG BY EXAMPLE

BACKGROUND

Current chatbot or natural language platforms (e.g., WATSON®, ALEX®, Siri®) are only partially machine-learning based. They enable designers to program user utterances (i.e., "intents") by example, but require them to program the agent utterances (i.e. "dialog") by rule. On the other hand, fully machine-learning-based methods exist in which chatbots are automatically generated from a corpus of text transcripts of conversation (e.g., neural conversational agent). These require designers to obtain, label and curate the training data.

SUMMARY

Embodiments relate to programming natural language (NL) dialog by example. One embodiment provides a method that includes receiving authoring conversational training data. A fully machine learning based conversational agent is trained with the conversational training data. The training includes: creating and storing example transcripts of user utterances, creating and storing example transcripts of agent utterances, sequencing utterance transcripts using the example transcripts of user utterances and the example transcripts of agent utterances, forming a corpus from the sequenced utterance transcripts, marking speech patterns that represent social actions from tagging the sequenced utterance transcripts, and forming a patterned corpus from the marked speech patterns.

These and other features, aspects and advantages of the present invention will become understood with reference to the following description, appended claims and accompanying figures.

BRIEF DESCRIPTION OF THE DRAWINGS

FIG. 5 is a block diagram illustrating a distributed system for programming dialog by example processing, according to one embodiment;

FIG. 6 illustrates an example of machine learning (ML) based undesirable dialog behavior;

FIG. 8A illustrates an example of conventional design conversation flow by transcript;

FIG. 9 illustrates an example of conventional test conversation;

FIG. 11 illustrates an example of marking dynamic entities, according to an embodiment;

FIG. 12 illustrates an example user interface for a transcript editor, according to an embodiment;

FIG. 13 illustrates an example of filtering by user intents and agent intents, according to an embodiment;

DETAILED DESCRIPTION

Figure 1:
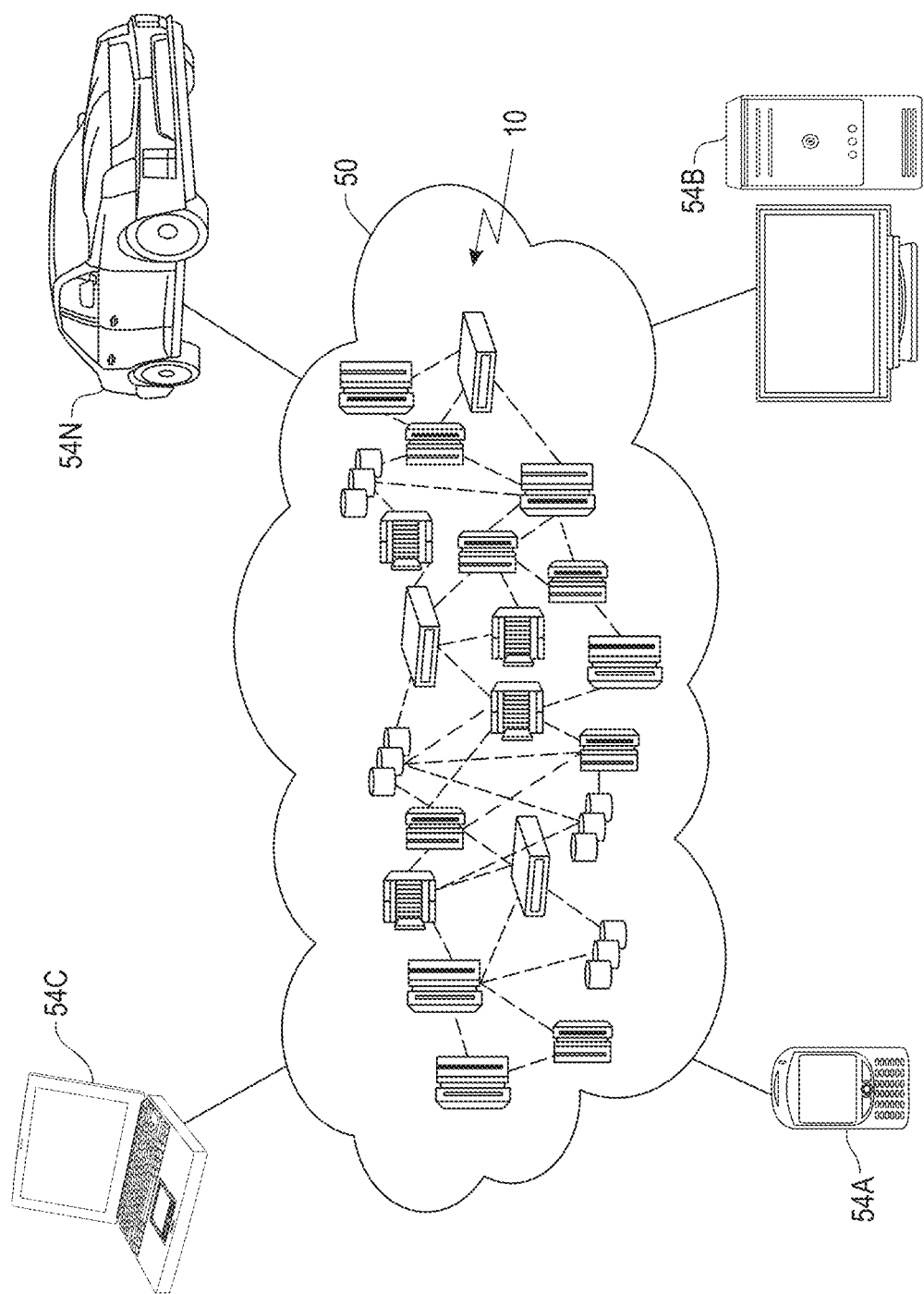
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to programming NL dialog by example. By "dialog" refers to the conditional logic where a system NL output is selected or generated given a particular user NL input and other contextual variables. One embodiment provides a method that includes receiving authoring conversational training data. A fully machine learning based conversational agent is trained with the conversational training data. The training includes: creating and storing example transcripts of user utterances, creating and storing example transcripts of agent utterances, sequencing utterance transcripts using the example transcripts of user utterances and the example transcripts of agent utterances, forming a corpus from the sequenced utterance transcripts, marking speech patterns that represent social actions from tagging the sequenced utterance transcripts, and forming a patterned corpus from the marked speech patterns.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
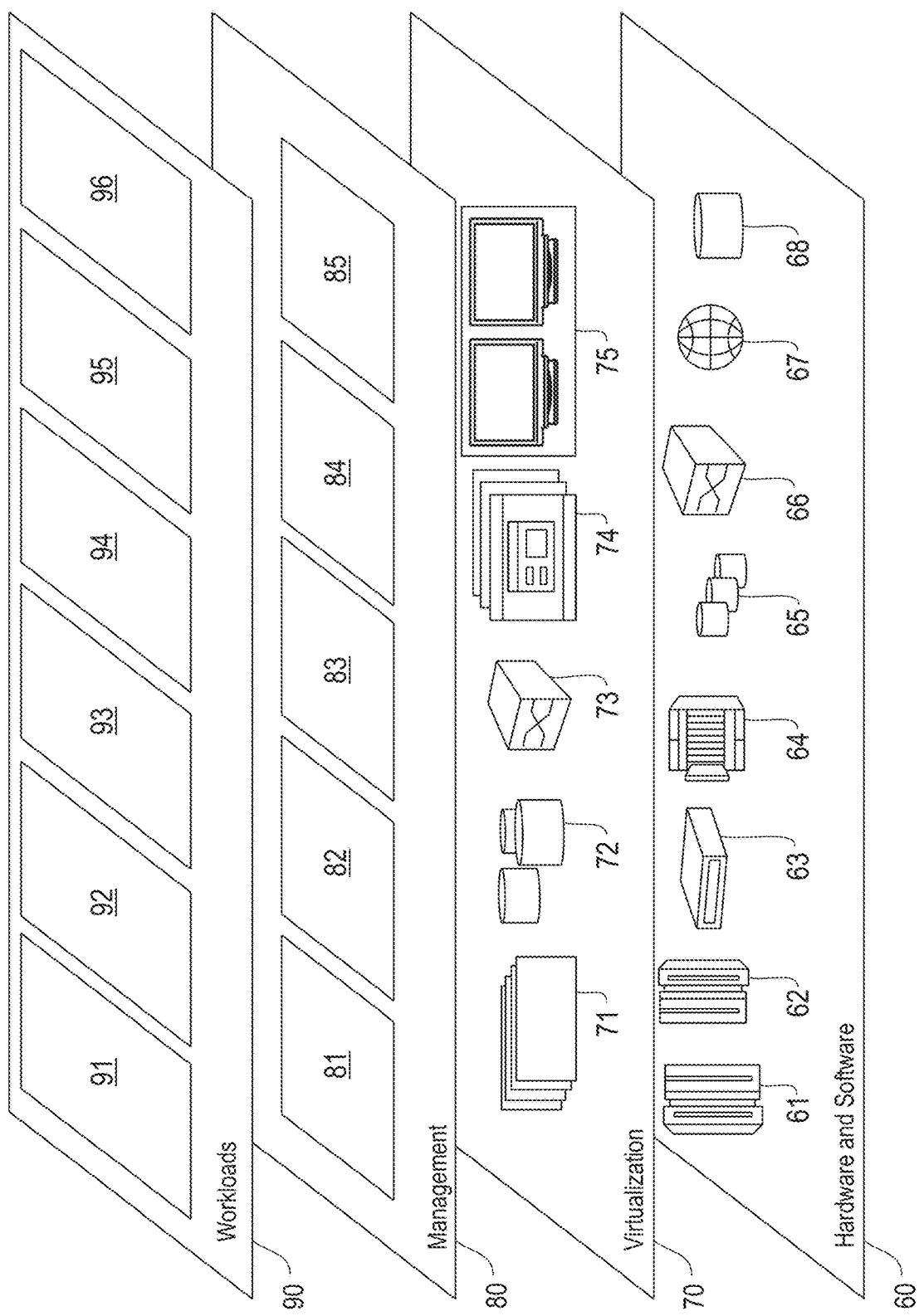
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and programming dialog by example processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), hardware system 400 (FIG. 4) or the cloud computing environment 50 (FIG. 1), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
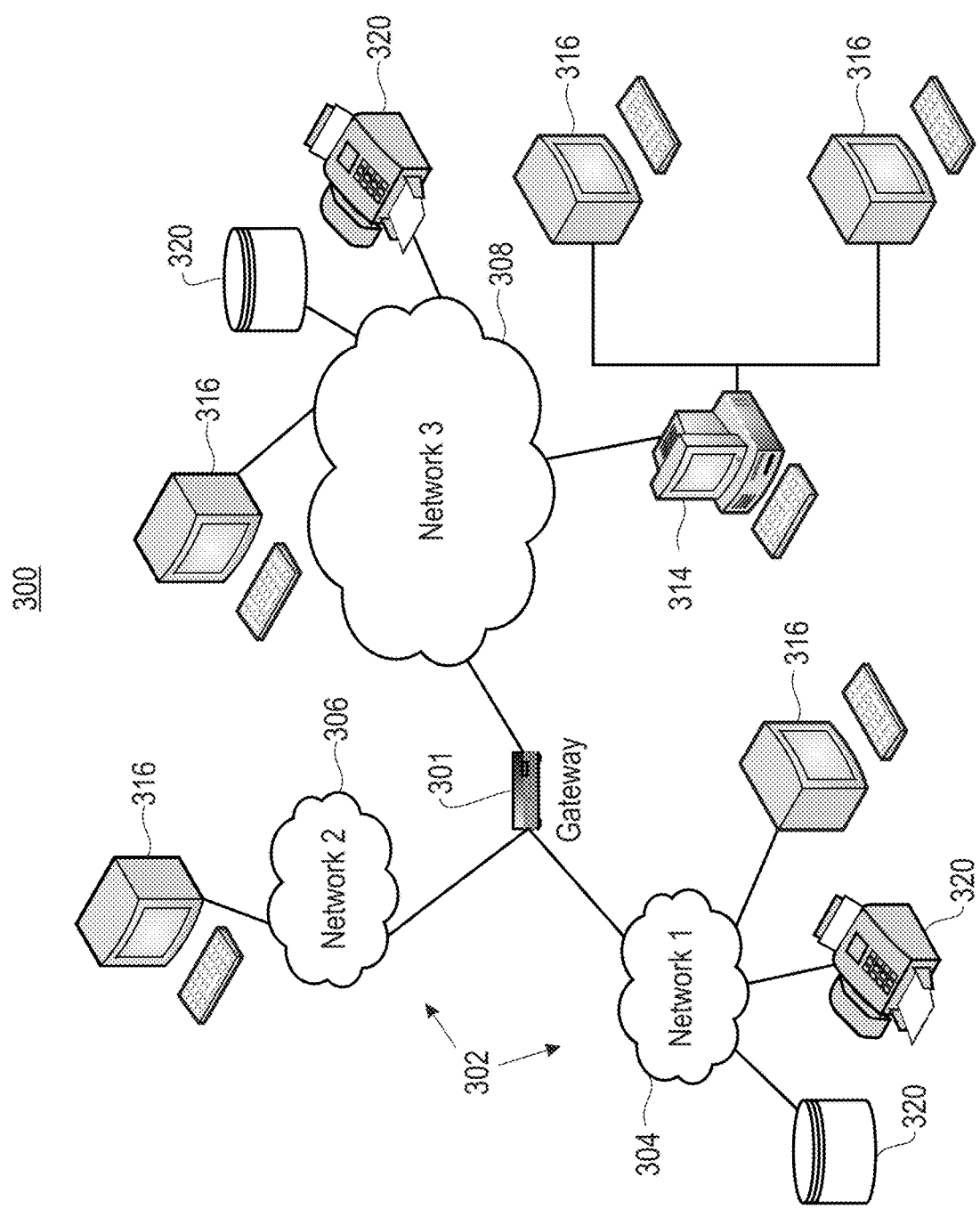
FIG. 3 is a network architecture of a system for programming dialog by example processing, according to an embodiment.

FIG. 3 is a network architecture of a system 300 for programming dialog by example, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
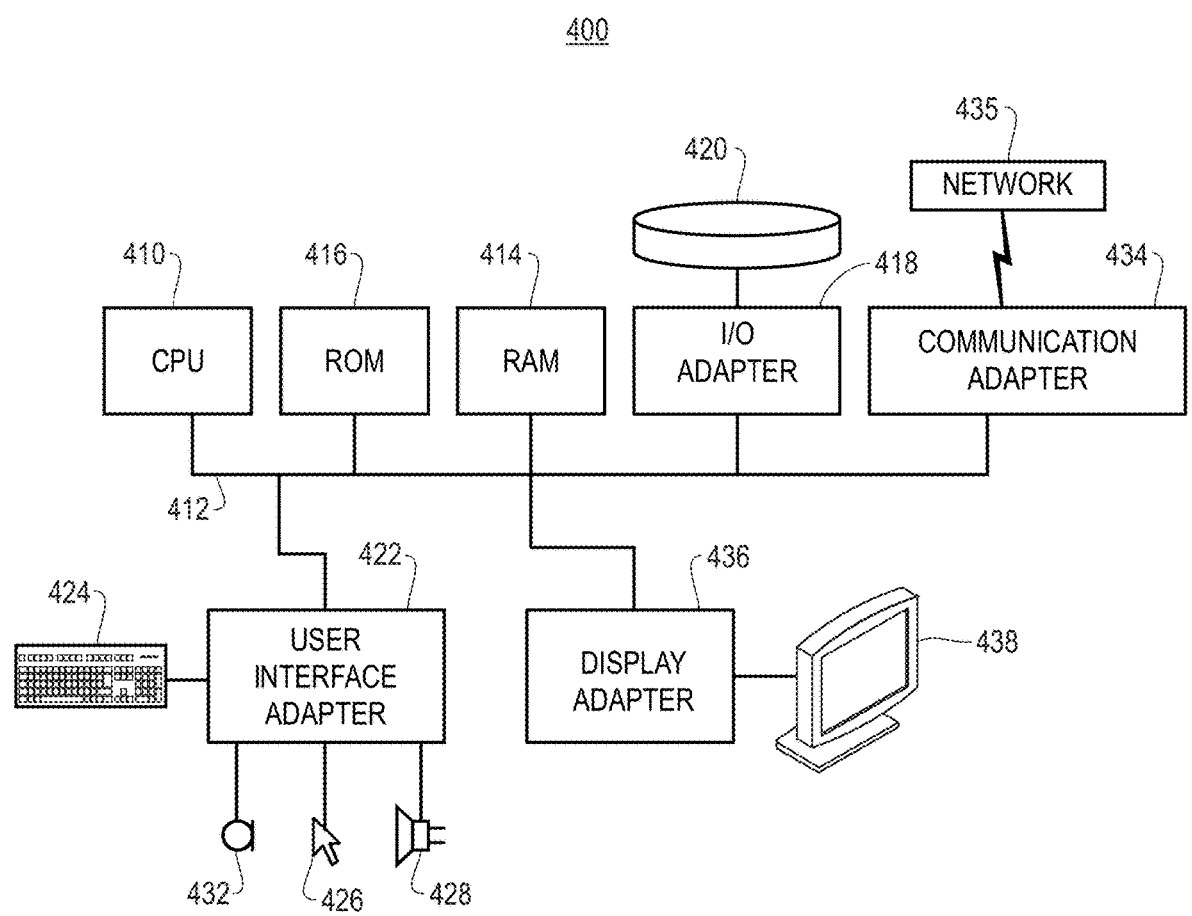
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a distributed system 500 that may be employed for programming dialog by example processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices are provided with cloud services from the servers 530 through the cloud or resource sharing environment 520.

In one embodiment, the system 500 provides processing for an authoring tool (or importing), refining and managing collections of short transcripts for use as training data by fully ML-based processing (e.g., neural conversational agent, seq2seq, etc.). In one embodiment, the system 500 processing enables designers to program everything by example, including: user utterances, context and agent utterances. The system 500 processing further enables designers to manage and modify the training examples to change the agent's behavior.

FIG. 6 illustrates an example of the undesirable dialog behavior from fully machine learning (ML) based techniques (e.g., seq2seq). Fully ML systems learn everything from text transcripts or logs of naturally occurring conversation, for example, Live Chat support logs (human-human). Although this eliminates the need for hand-crafting dialog rules, the output still tends to be unpredictable, inconsistent and sometimes nonsensical, as we can see in example 600, lines 6, 8 and 10. Obtaining and managing training data for fully ML-based methods is difficult. Data may not exist, in the world or in text form. On the other hand, conventional techniques, which use ML only for classifying users' natural language inputs (e.g., intent-entity-response), require manual programming dialog rules for determining the system's outputs. Although designers can often use simple, GUI-based programming tools, this is still difficult because natural conversation is complex. With such partial ML systems, designers must figure out how to model the structure of natural conversation on their own. Thus, both fully ML-based systems and partial ML-based systems have their own unique limitations and pitfalls.

Figure 7:
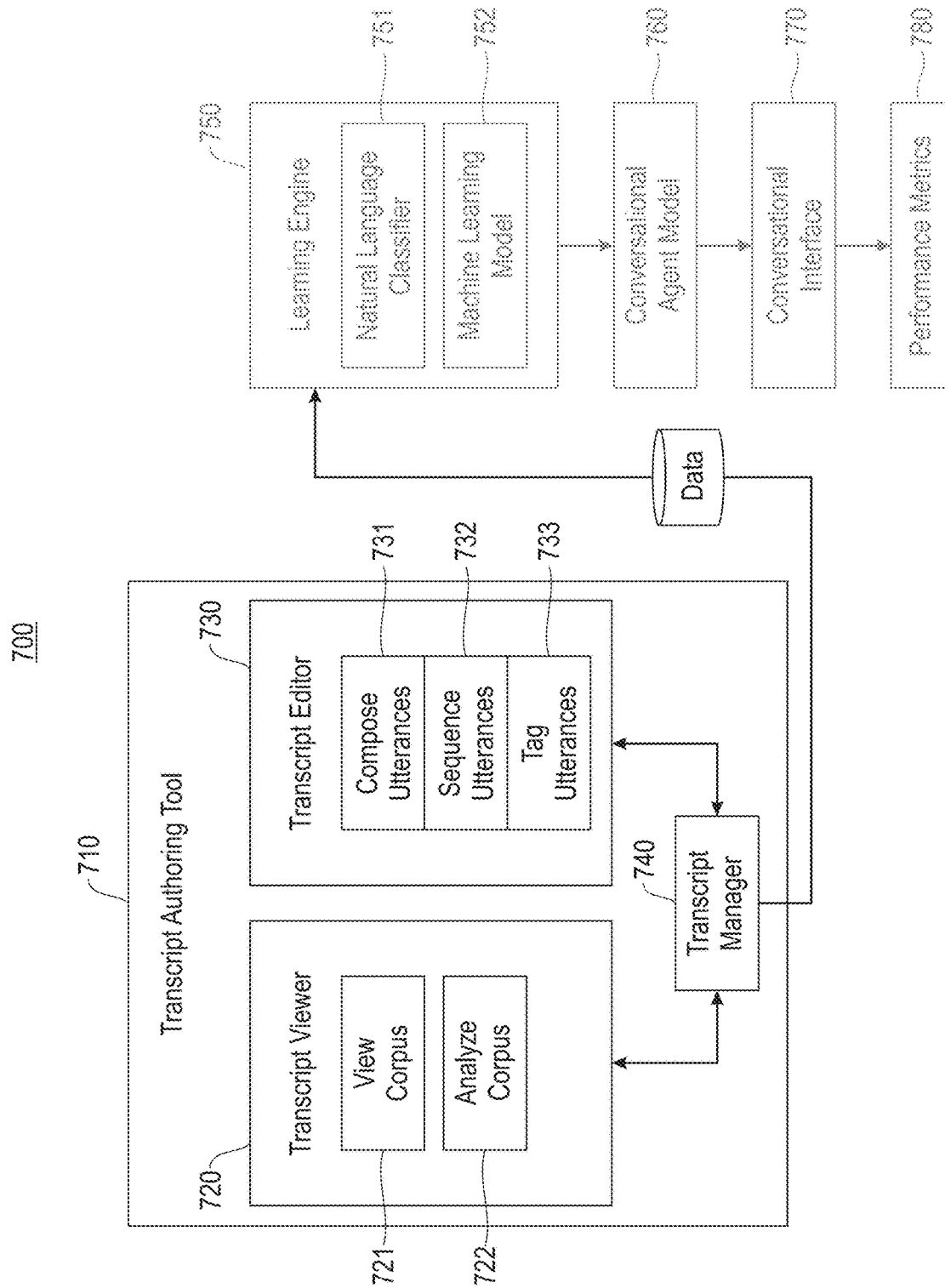
FIG. 7 illustrates a block diagram of components of a system for programming dialog by example processing, according to one embodiment.

FIG. 7 illustrates a block diagram of components of a system 700 for programming dialog by example processing, according to one embodiment. In one embodiment, the system 700 includes a transcript authoring tool 710, a learning engine 750 (e.g., using ML, artificial intelligence (AI), etc.), conversational agent model 760, conversational interface 770 and performance metrics 780. The transcript authoring tool 710 provides processing for viewing through the transcript viewer 720, authoring and refining through the transcript editor 730 and managing collections/corpus, through the transcript manager 740, of short transcripts for use as training data by a fully ML-based process (e.g., neural conversational agent, seq2seq, etc.). Programming dialog by example eliminates the need to hand-craft dialog rules, like partial ML approaches, and reduces the undesirable dialog behavior of fully ML approaches by enabling designers to create and curate the training data.

In one embodiment, the transcript viewer 720 provides for viewing the corpus through the viewing corpus 721 GUI, and analyzing the corpus through the analyze corpus 722 GUI. The transcript editor 730 provides processing for composing utterances through the compose utterances processing 731, sequence utterances processing 732 and ability to tag utterances through tag utterances processing 733. The transcript manager 740 processing manages the transcripts between the transcript viewer 720 and the transcript editor 730, and provides the utterances as needed to the learning engine processing 750. In one embodiment, existing learning engine processing may be employed for the learning engine processing 750. The learning engine processing 750 includes existing components including a natural language classifier 751 and machine learning model 752. The remaining processing stream may include existing conversational agent model 760, a conversational interface 770 and performance metrics processing 780.

In one embodiment, the transcript authoring tool 710 processing frees conversational user interface (UX) designers from having to program dialog through rules. This is easier and more flexible than conventional, partial ML methods (e.g., intent-entity-response), and it opens dialog design to a wider range of designers. As of today, no existing chatbot or virtual assistant platform enables programming dialog by example. Partial ML platforms only enable designers to program intents, or user inputs, by example: dialog, or the system's conditional responses, must be programmed by hand. In one embodiment, the system 700 combines two methods in a creative way: intent authoring and machine learning. Designers create transcripts, using the transcript editor 730, that embody the patterns they want their agent to exhibit, and those patterns are then recognized through deep learning.

Conversational interfaces are a key enabling component of many cognitive computing and AI applications. Authoring naturalistic dialog on all platforms (IBM, Amazon, Google, Apple, Microsoft, etc.) is difficult. In one embodiment, processing for the transcript authoring tool 710 include a supervised ML model, such as multinomial logistic regression or a recurrent neural network (RNN) model, which can take features from a sequence of tokens as well as intents and actions and then trains the model to predict the sequence of intents and actions to generate the response provided from the conversational agent.

Figure 8B:
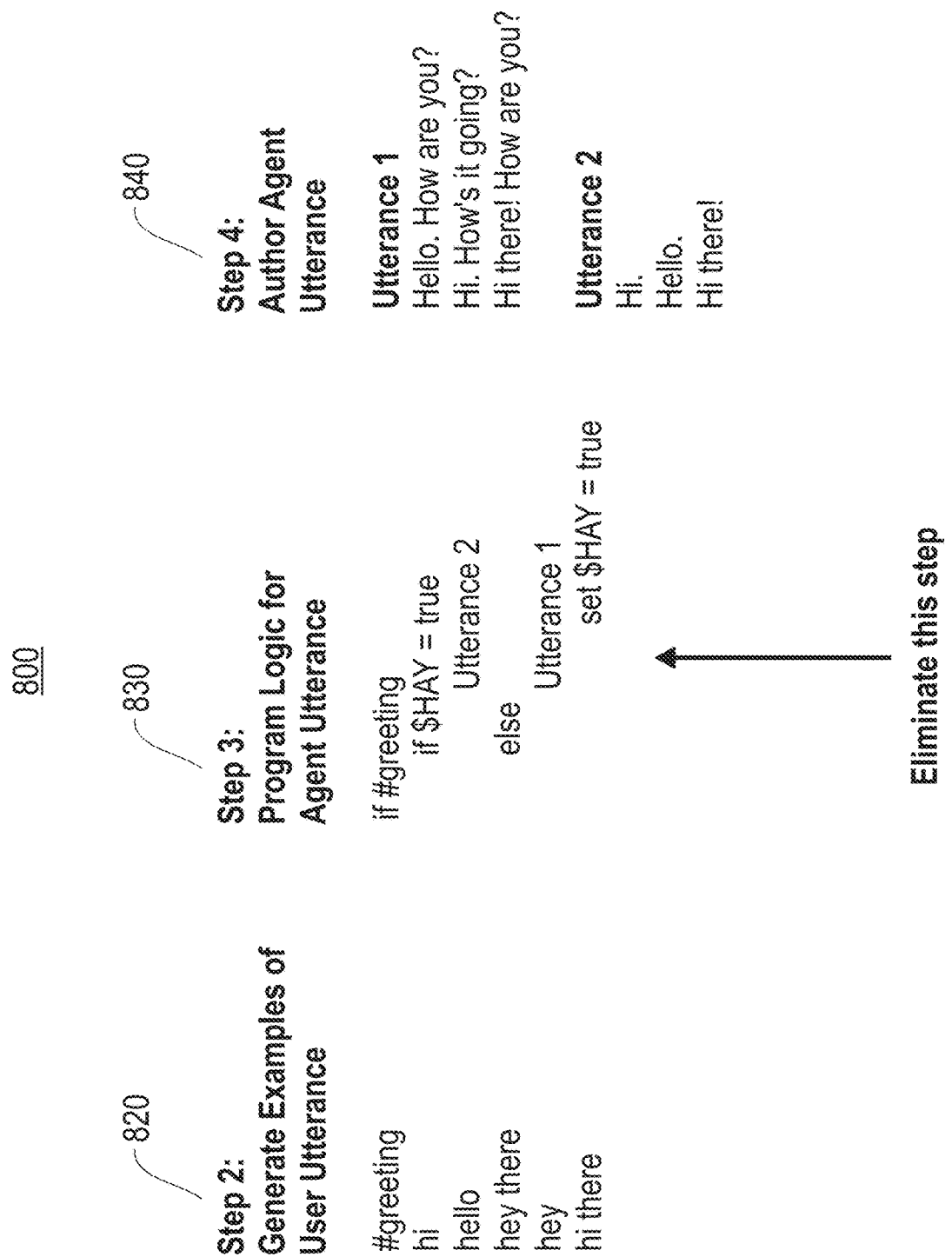
FIG. 8B illustrates an example of conventional program intent by example, dialog by rule conversation flow.

FIGS. 8A-B illustrate an example 800 of conventional design conversation flow by transcript. In step 1 810, the design of the conversation flow by transcript is shown. Step 2 820 shows generation of examples of a user utterance. Step 3 830 includes program logic for an agent utterance. In one embodiment, the processing for the transcript authoring tool 710 eliminates step 3 by using fully ML processing techniques, (e.g., seq2seq). Fully ML techniques learn the sequential patterns of utterances from example transcripts so that designers do not need to program them manually. However, instead of simply processing existing, often messy, data, as conventional fully ML methods do, this tool enables designers to easily author, edit and curate the training transcripts to produce a clean and consistent basis for ML. In step 4 840, authoring of agent utterances is provided. FIG. 9 illustrates an example 900 of a resulting of a conventional test conversation from the example 800 in FIGS. 8A-B.

Figure 10:
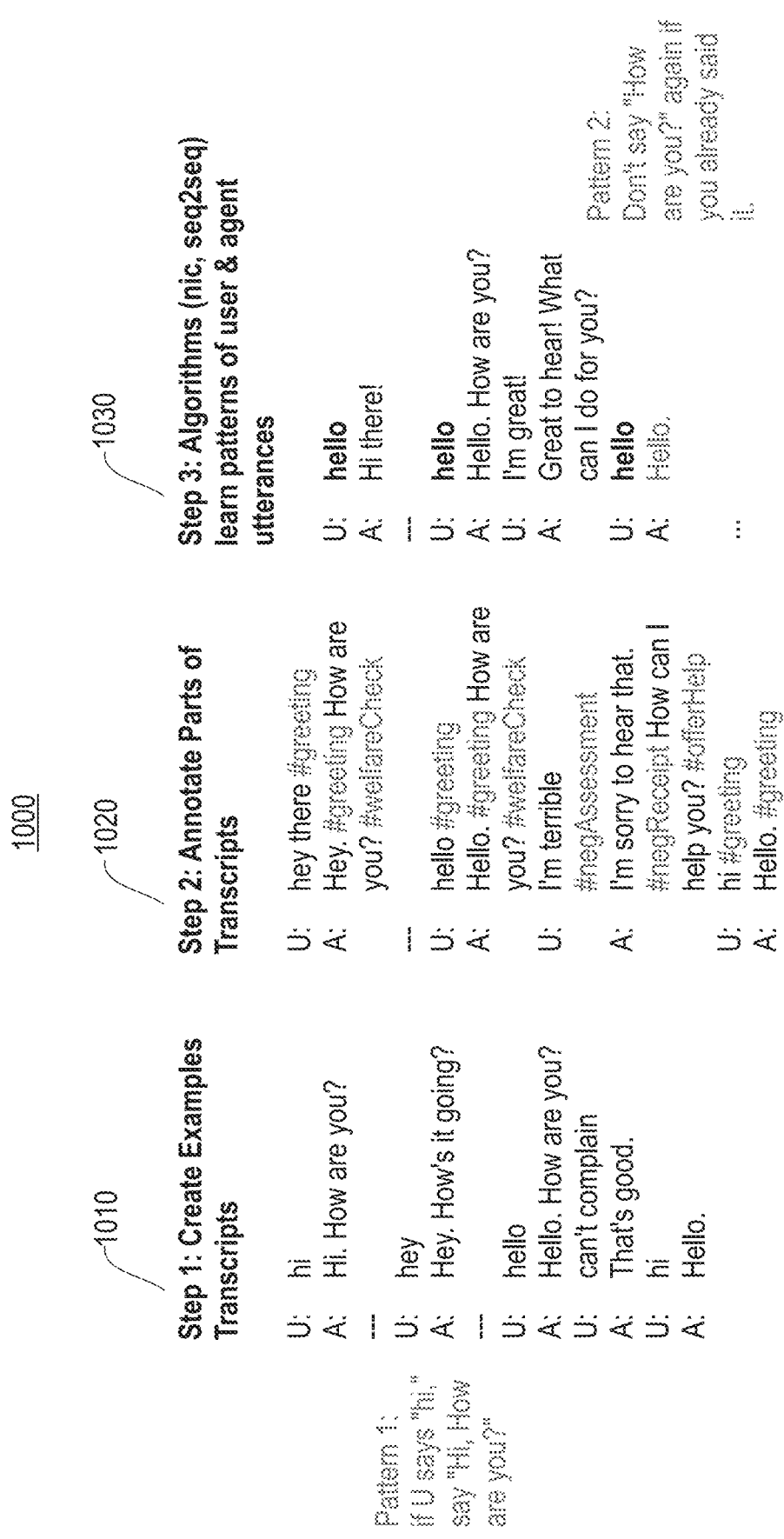
FIG. 10 illustrates an example of program intent and dialog by example, according to an embodiment.

FIG. 10 illustrates an example 1000 of program intent and dialog by example, according to an embodiment. In step 1 1010, the transcript editor 730 (FIG. 7) is used for creation of examples transcripts. The ML processing of the transcript manager 740 determines the pattern 1 of if U says "hi," say "hi, how are you?" In step 2 1020, the transcript editor 730 is employed to annotate parts of the transcripts (from step 1 1010) with tagging of utterances using compose utterances 731 processing, sequence utterances 732 processing and the tag utterances 733 processing. In step 3 1030, the ML algorithms (or ML processing) learns sequential patterns of the user and agent utterances, as well as natural language classification of those utterances. In one example, one result of step 3 could be finding a pattern 2 to avoid an utterance, such as do not say "how are you?" again if the agent already stated such.

FIG. 11 illustrates an example 1100 of marking dynamic entities, according to an embodiment. In one embodiment, the example 1100 shows a step 2.5 1110 of annotating dynamic entities. Step 2.5 shows a result of using the transcript editor 730 (FIG. 7) of annotating Bob, Jill, Ray, Peggy and Don in parentheses and adding @name. In the sub-example 1120, a dynamic entity is replaced with a context variable. In the first sub-example, the user answers a query from the agent with "Anne." The agent transcript inserts $name in parentheses in a reply transcript. In the second sub-example, the user replies to the gent query with "call me Jim." The agent transcript is annotated with $name in parentheses in a reply transcript.

FIG. 12 illustrates an example user interface 1200 for the transcript editor 730 (FIG. 7), according to an embodiment. The user interface 1200 includes entries for user transcript authoring (user entry 1210; e.g., "hey there") and agent transcript authoring (agent entry 1220; e.g., "Hey. How are you?"). The user interface 1200 determines recommended intents 1230 based on the user entry(ies) 1210 and agent entry(ies) 1220 and display the recommended intents 1230. The author can enter the intents where desired. For example, the author added the tag #greeting after "hey there" in the user entry 1210, and the tags #greeting after "Hey" and #welfareCheck after "How are you?"

FIG. 13 illustrates an example 1300 of filtering by user intents and agent intents, according to an embodiment. In one embodiment, the user interface for the transcript authoring tool 710 (FIG. 7) provides a filters entry 1310 for filtering user intents and agent intents. In example 1300, the tag #greeting is used for filtering user intents, and the tag #welfareCheck is used for filtering agent intents. The results 1320 in example 1300 displays 12 as the number of resulting examples for the filtered intents. The examples are displayed in the user interface below the results 1320.

Figure 14:
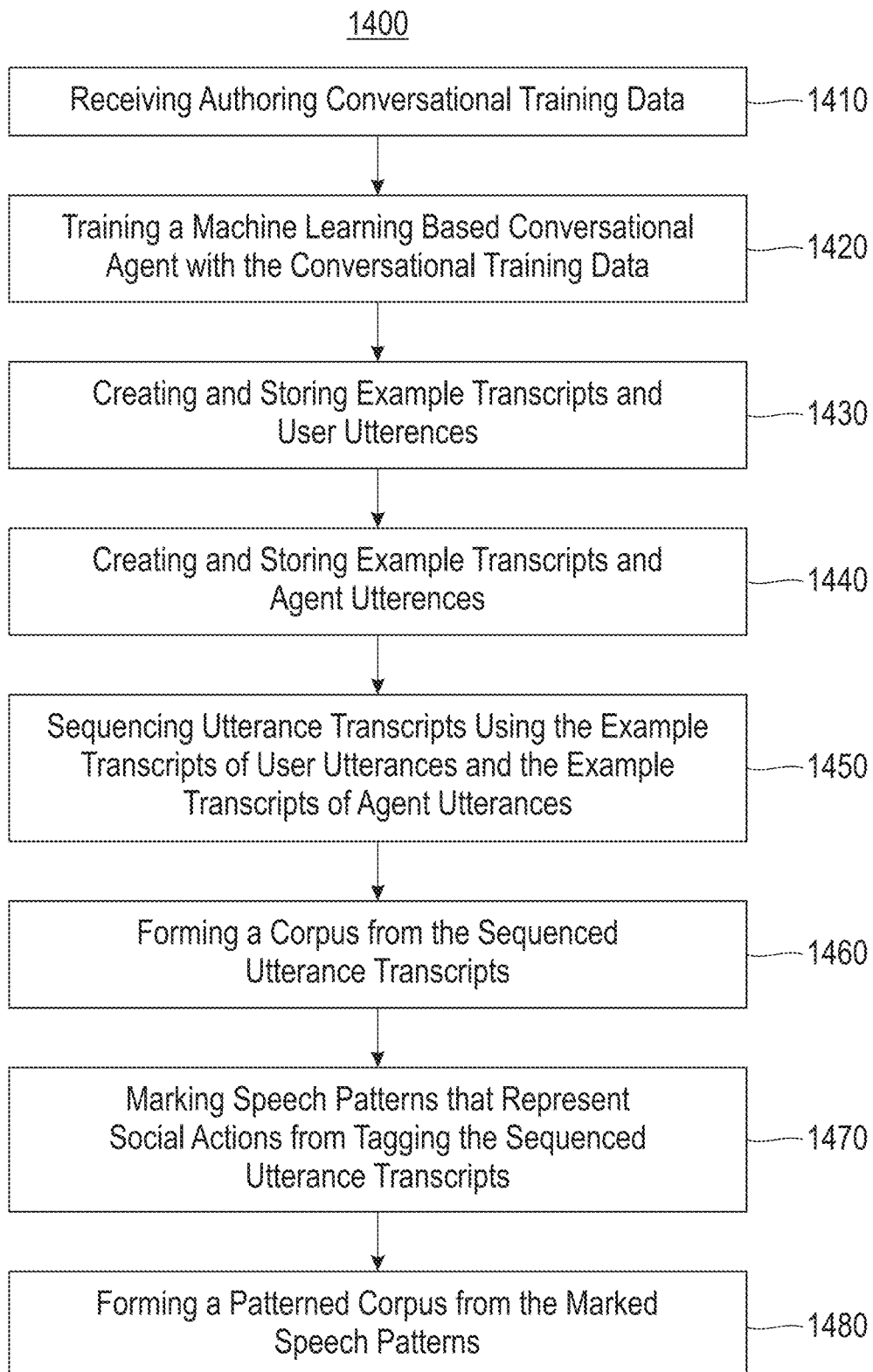
FIG. 14 illustrates a block diagram of a process for programming dialog by example, according to one embodiment.

FIG. 14 illustrates a block diagram of a process 1400 for programming NL dialog by example, according to one embodiment. In block 1410, process 1400 receives authoring conversational training data (e.g., using a processor from computing node 10, FIG. 1, hardware and software layer 60, FIG. 2, processing system 300, FIG. 3, system 400, FIG. 4, system 500, FIG. 5, system 700, FIG. 7, etc.). In block 1420, process 1400 trains a fully machine learning based conversational agent with the conversational training data. In block 1430, process 1400 creates and stores example transcripts of user utterances. In block 1440, process 1400 creates and stores example transcripts of agent utterances. In block 1450, process 1400 sequences utterance transcripts using the example transcripts of user utterances and the example transcripts of agent utterances. In block 1460, process 1400 forms a corpus from the sequenced utterance transcripts. In block 1470, process 1400 marks speech patterns that represent social actions from tagging the sequenced utterance transcripts. In block 1480, process 1400 forms a patterned corpus from the marked speech patterns.

In one embodiment, process 1400 may further include analyzing the patterned corpus to determine annotation entry positions. Process 1400 may additionally include annotating user and agent utterance transcripts based on the determined annotation entry positions.

In one embodiment, process 1400 may further include receiving marked variable entries in the example transcripts of user utterances and the example transcripts of agent utterances. Process 1400 may additionally include receiving edits for the example transcripts of user utterances to correct behavior of the machine learning based conversational agent, and receiving edits of the example transcripts of agent utterances to correct behavior of the machine learning based conversational agent.

In one embodiment, in process 1400 a software tool provides an interface for: receiving the marked variable entries, receiving the edits for the example transcripts of user utterances, and receiving the edits for the example transcripts of agent utterances. In one embodiment, process 1400 may include filtering the patterned corpus by user intents and agent intents, and providing filtered results including example sequences of user and agent transcripts.

Figure 15:
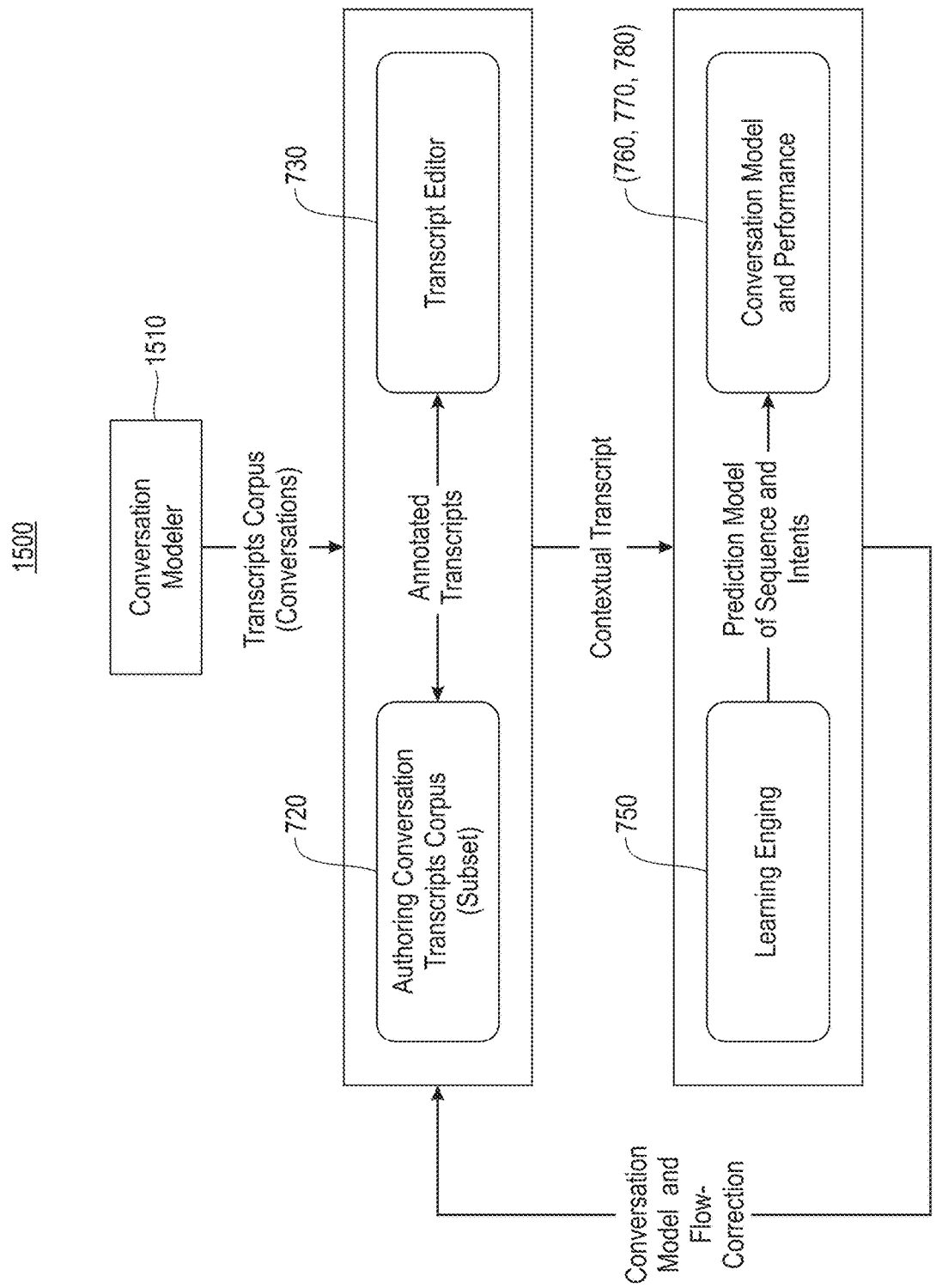
FIG. 15 illustrates a flow diagram of a process for programming NL dialog by example, according to one embodiment.

FIG. 15 illustrates a flow diagram 1500 of a process for programming NL dialog by example, according to one embodiment. In one embodiment, the conversation modeler 1510 is provided with the transcripts corpus (e.g., conversations, etc.) to the transcript viewer 720 (see also, FIG. 7) and the authoring and refining through the transcript editor 730 for annotating transcripts. The output of the viewer and editor is a contextual transcript that reflects the meta information relevant for the current conversation and which forms meaningful training data for the next embodiment. The contextual transcript is provided to the learning engine 750 for forming the prediction model of sequence and intents, which are then provided to the conversation model and performance module for testing the conversation flow to detect any issue with the automated intents and sequences, which includes the conversational agent model 760, the conversational interface 770 and the performance metrics 780 processing. In case of the performance of the current model is not at the optimum level then in one embodiment, the flow proceeds back to the transcript viewer 720 and the authoring and refining through the transcript editor 730 for conversation model and flow correction.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving authoring conversational training data; and
   training a fully machine learning based conversational agent with the conversational training data for learning sequential patterns of user utterances and of agent utterances and for learning natural language classification of the user utterances and the agent utterances, comprising:
      creating and storing example transcripts of user utterances from a software editing tool;
      creating and storing example transcripts of agent utterances from the software editing tool;
      sequencing utterance transcripts using the example transcripts of user utterances and the example transcripts of agent utterances;
      forming a corpus from the sequenced utterance transcripts;
      marking dynamic entities of speech patterns that represent social actions from tagging the sequenced utterance transcripts, wherein the sequenced utterance transcripts embody desired speech patterns for the fully machine learning based conversational agent to exhibit;

training a supervised machine learning model of the software editing tool with the sequenced utterance transcripts; and forming a patterned corpus from the marked speech patterns;

wherein the trained fully machine learning based conversational agent predicts a sequence of intents and actions, and generates responses based on the predictions.

2. The method of claim 1, further comprising:

analyzing the patterned corpus to determine annotation entry positions; and replacing the marked dynamic entities with context variable entries.

3. The method of claim 2, further comprising:

annotating user and agent utterance transcripts based on the determined annotation entry positions.

4. The method of claim 2, further comprising:

receiving the context variable entries in the example transcripts of user utterances and the example transcripts of agent utterances.

5. The method of claim 4, further comprising:

receiving edits for the example transcripts of user utterances to correct behavior of the machine learning based conversational agent.

6. The method of claim 5, further comprising:

receiving edits of the example transcripts of agent utterances to correct behavior of the machine learning based conversational agent.

7. The method of claim 6, wherein:

the software editing tool provides an interface for:
  receiving the context variable entries;
  receiving the edits for the example transcripts of user utterances; and
  receiving the edits for the example transcripts of agent utterances; and the software editing tool uses the supervised machine learning model that takes features from a sequence of tokens and the sequence of intents and actions, the supervised machine learning model is trained to predict the sequence of intents and actions that generate the responses provided from the trained fully machine learning based conversational agent, and output from the software editing tool is a contextual transcript reflecting meta information relevant for a current conversation and forms next training data.

8. The method of claim 7, further comprising:

filtering the patterned corpus by user intents and agent intents using tags from the tagging of the sequenced utterance transcripts; and providing filtered results including example sequences of user and agent transcripts.

9. A computer program product for programming dialog by example, the computer program product comprising a computer readable storage medium having program instructions embodied therewith, the program instructions executable by a processor to cause the processor to:

receive, by the processor, authoring conversational training data;

train, by the processor, a fully machine learning based conversational agent with the conversational training data for learning sequential patterns of user utterances and of agent utterances and for learning natural language classification of the user utterances and the agent utterances, comprising:

create and store, by the processor, example transcripts of user utterances from a software editing tool;

create and store, by the processor, example transcripts of agent utterances from the software editing tool;

sequence, by the processor, utterance transcripts using the example transcripts of user utterances and the example transcripts of agent utterances;

form, by the processor, a corpus from the sequenced utterance transcripts;

mark, by the processor, dynamic entities of speech patterns that represent social actions from tagging the sequenced utterance transcripts, wherein the sequenced utterance transcripts embody desired speech patterns for the fully machine learning based conversational agent to exhibit;

train, by the processor, a supervised machine learning model of the software editing tool with the sequenced utterance transcripts; and form, by the processor, a patterned corpus from the marked speech patterns;

wherein the trained fully machine learning based conversational agent predicts a sequence of intents and actions, and generates responses based on the predictions.

10. The computer program product of claim 9, wherein the program instructions executable by the processor further to cause the processor to:

analyze, by the processor, the patterned corpus to determine annotation entry positions;

replacing the marked dynamic entities with context variable entries; and annotate, by the processor, user and agent utterance transcripts based on the determined annotation entry positions.

11. The computer program product of claim 10, wherein the program instructions executable by the processor further to cause the processor to:

receive, by the processor, the context variable entries in the example transcripts of user utterances and the example transcripts of agent utterances.

12. The computer program product of claim 11, wherein the program instructions executable by the processor further to cause the processor to:

receive, by the processor, edits for the example transcripts of user utterances to correct behavior of the machine learning based conversational agent; and receive, by the processor, edits for the example transcripts of the example transcripts of agent utterances to correct behavior of the machine learning based conversational agent.

13. The computer program product of claim 12, wherein:

the software editing tool provides an interface for:
  receiving the context variable entries;
  receiving the edits for the example transcripts of user utterances; and
  receiving the edits for the example transcripts of agent utterances; and the software editing tool uses the supervised machine learning model that takes features from a sequence of tokens and the sequence of intents and actions, the supervised machine learning model is trained to predict the sequence of intents and actions that generate the responses provided from the trained fully machine learning based conversational agent, and output from the software editing tool is a contextual transcript reflecting meta information relevant for a current conversation and forms next training data.

14. The computer program product of claim 13, wherein the program instructions executable by the processor further to cause the processor to:
filter, by the processor, the patterned corpus by user intents and agent intents using tags from the tagging of the sequenced utterance transcripts; and
provide, by the processor, filtered results including example sequences of user and agent transcripts.

15. An apparatus comprising:
a memory configured to store instructions; and
a processor configured to execute the instructions to:
receive authoring conversational training data; and
train a fully machine learning based conversational agent with the conversational training data for learning sequential patterns of user utterances and of agent utterances and for learning natural language classification of the user utterances and the agent utterances, comprising:
creating and storing example transcripts of user utterances from a software editing tool;
creating and storing example transcripts of agent utterances from the software editing tool;
sequencing utterance transcripts using the example transcripts of user utterances and the example transcripts of agent utterances;
forming a corpus from the sequenced utterance transcripts;
marking dynamic entities of speech patterns that represent social actions from tagging the sequenced utterance transcripts, wherein the sequenced utterance transcripts embody desired speech patterns for the fully machine learning based conversational agent to exhibit;
training a supervised machine learning model of the software editing tool with the sequenced utterance transcripts; and
forming a patterned corpus from the marked speech patterns;
wherein the trained fully machine learning based conversational agent predicts a sequence of intents and actions, and generates responses based on the predictions.

16. The apparatus of claim 15, wherein the processor is further configured to execute the instructions to:

analyze, by the processor, the patterned corpus to determine annotation entry positions;
replace, by the processor, the marked dynamic entities with context variable entries; and
annotate, by the processor, user and agent utterance transcripts based on the determined annotation entry positions.

17. The apparatus of claim 14, wherein the processor is further configured to execute the instructions to:
receive the context variable entries in the example transcripts of user utterances and the example transcripts of agent utterances.

18. The apparatus of claim 17, wherein the processor is further configured to execute the instructions to:
receive edits for the example transcripts of user utterances to correct behavior of the machine learning based conversational agent; and
receive edits for the example transcripts of the example transcripts of agent utterances to correct behavior of the machine learning based conversational agent.

19. The apparatus of claim 18, wherein:
the software editing tool provides an interface for:
receiving the context variable entries;
receiving the edits for the example transcripts of user utterances; and
receiving the edits for the example transcripts of agent utterances; and
the software editing tool uses the supervised machine learning model that takes features from a sequence of tokens and the sequence of intents and actions, the supervised machine learning model is trained to predict the sequence of intents and actions that generate the responses provided from the trained fully machine learning based conversational agent, and output from the software editing tool is a contextual transcript reflecting meta information relevant for a current conversation and forms next training data.

20. The apparatus of claim 19, wherein the processor is further configured to execute the instructions to:
filter the patterned corpus by user intents and agent intents using tags from the tagging of the sequenced utterance transcripts; and
provide filtered results including example sequences of user and agent transcripts.

\* \* \* \* \*